United States Patent
Garay et al.

(10) Patent No.: US 8,977,715 B2
(45) Date of Patent: Mar. 10, 2015

(54) METHOD FOR COMMUNICATING DATA BETWEEN LOCALLY NETWORKED HETEROGENEOUS PROCESSING SYSTEMS AND COMMUNICATION SYSTEM USING SAID METHOD

(75) Inventors: Stephane Garay, Venerque (FR); Philippe Herry, Plaisance du Touch (FR); Dominique Pronto, Fonsorbes (FR)

(73) Assignee: Airbus Operations (SAS), Toulouse (FR)

( * ) Notice: Subject to any disclaimer, the term of this patent is extended or adjusted under 35 U.S.C. 154(b) by 1406 days.

(21) Appl. No.: 12/293,647

(22) PCT Filed: Mar. 20, 2007

(86) PCT No.: PCT/FR2007/050969
§ 371 (c)(1),
(2), (4) Date: Jun. 17, 2010

(87) PCT Pub. No.: WO2007/107674
PCT Pub. Date: Sep. 27, 2007

(65) Prior Publication Data
US 2010/0312835 A1    Dec. 9, 2010

(30) Foreign Application Priority Data
Mar. 21, 2006 (FR) ...................................... 06 50971

(51) Int. Cl.
*G06F 15/16* (2006.01)
*H04L 29/08* (2006.01)
(Continued)

(52) U.S. Cl.
CPC .............. *H04L 67/12* (2013.01); *H04L 67/10* (2013.01); *H04L 67/327* (2013.01); *H04L 69/08* (2013.01); *H04L 69/18* (2013.01); *H04L 69/40* (2013.01); *H04L 67/38* (2013.01)
USPC ................ 709/219; 709/238; 725/75; 725/76

(58) Field of Classification Search
CPC ....... H04L 67/12; H04L 67/10; H04L 67/327; H04L 69/18; H04L 69/08; H04L 67/38; H04L 69/40
USPC .............. 709/217–219, 238–244; 725/75, 76
See application file for complete search history.

(56) References Cited

U.S. PATENT DOCUMENTS 5,778,203 A * 7/1998 Birkedahl et al. ............ 710/306
6,789,126 B1   9/2004 Saulpaugh et al.
(Continued)

FOREIGN PATENT DOCUMENTS

EP    0451897 A2    10/1991

OTHER PUBLICATIONS

International Search Report dated Nov. 9, 2007.

*Primary Examiner* — Phuoc Nguyen
(74) *Attorney, Agent, or Firm* — Greer, Burns & Crain, Ltd.

(57) ABSTRACT

A method for communicating data in an aircraft between at least a first data processing system and a second data processing system locally networked, each processing system being capable of executing at least one application, wherein the data to be exchanged are organized in messages, the aforementioned messages as well as the processing systems and the applications being defined in files stored in a backup unit connected to the network and accessible by the data processing systems.

14 Claims, 5 Drawing Sheets

(51) Int. Cl.
  *H04L 29/06* (2006.01)
  *H04L 29/14* (2006.01)

(56) References Cited

U.S. PATENT DOCUMENTS

| | | | |
|---|---|---|---|
| 6,801,769 B1* | 10/2004 | Royalty | 455/431 |
| 6,963,993 B1* | 11/2005 | Semancik et al. | 714/2 |
| 7,631,068 B1* | 12/2009 | Martins | 709/224 |
| 7,873,684 B2* | 1/2011 | Souder et al. | 707/825 |
| 2001/0054009 A1* | 12/2001 | Miller et al. | 705/26 |
| 2003/0069990 A1* | 4/2003 | D'Annunzio et al. | 709/242 |
| 2003/0093798 A1* | 5/2003 | Rogerson | 725/75 |
| 2003/0177411 A1* | 9/2003 | Dinker et al. | 714/13 |
| 2003/0229603 A1 | 12/2003 | Childress et al. | |
| 2004/0128370 A1* | 7/2004 | Kortright | 709/221 |
| 2004/0187095 A1 | 9/2004 | Gilfix et al. | |
| 2005/0027848 A1* | 2/2005 | Kamenetsky et al. | 709/223 |
| 2005/0038831 A1* | 2/2005 | Souder et al. | 707/201 |

* cited by examiner

| Structure | Values |
|---|---|
| ⊟ Applications | |
|   ProtocolVersion | 3.0 |
|   DataVersion | D,E,F |
|   ⊟ Application | |
|     Name | A1 |
|     MachineName | H1 |
|     ⊟ Channel | |
|       ⊟ Channel | |
|         Name | C1 |
|         EthernetCardName | @IP1 |
|         PortNumber | 5101 |
|         Endianness | BIG |
|         ProtocolType | TCP |
|         ClientServerType | SERVER |
|       ⊟ Channel | |
|         Name | C2 |
|         EthernetCardName | @IP2 |
|         PortNumber | 5102 |
|         Endianness | BIG |
|         ProtocolType | UDP |
|         ClientServerType | NONE |
| ⊞ Application | |
| ⊞ Application | |
| ⊞ Application | |

Fig. 5

| Structure | Values |
|---|---|
| ⊟ MyInfos | |
|   ProtocolVersion | 3.0 |
|   DataVersion | J,K,L |
|   ⊟ Application | |
|     Name | A1 |

Fig. 6

| Structure | Values |
|---|---|
| ▼ Messages | |
|   ProtocolVersion | 3.0 |
|   DataVersion | G.H.I |
|   ▼ Message | |
|     Comment | M1 |
|     Type | SIMU |
|     CommunicationType | SAMPLING |
|     CommunicationPeriod | 40 |
|     ▼ ProducerApplications | |
|       ▼ ProducerApplication | |
|         Name | A1 |
|         ChannelName | C1 |
|     ▼ ConsumerApplications | |
|       ▼ ConsumerApplication | |
|         Name | A3 |
|         ChannelName | C4 |
|     ▼ Header | |
|       ▼ Identifier | |
|         Name | Identifier |
|         Type | I32 |
|         Dimension | 1 |
|         Value | 1 |
|       ▼ Length | |
|         Name | Length |
|         Type | I32 |
|         Dimension | 1 |
|         Value | 52 |
|     ▼ Parameters | |
|       ▼ Parameter | |
|         Name | param1 |
|         Type | I32 |
|         Dimension | 1 |
|       ▼ Parameter | |
|         Name | param2 |
|         Type | F64 |
|         Dimension | 5 |

Fig. 7

| ID | Nom | Emetteur | Récepteur | Paramètres |
|----|-----|----------|-----------|------------|
| 1 | M1 | A1:C1 | A3:C4 | I32 param1<br>F64 param2 [5] |
| 2 | M2 | A1:C1 | A3:C4 | F64 param3<br>F64 param4 |
| 3 | M3 | A3:C4 | A1:C1 | F32 param5<br>F32 param6<br>C08 param7 [10]<br>I32 param8 |
| 4 | M4 | A1:C2 | A4:C5 | C08 param9 [128] |
| 5 | M5 | A2:C3 | A4:C5 | C08 param10 [128] |
| 6 | M6 | A4:C5 | A1:C2 and<br>A2:C3 | C08 param11 [64]<br>C08 param12 [256] |

KEY:
Nom = Name
Emetteur = Emitter
Récepteur = Receiver
Paramètres = Parameters

METHOD FOR COMMUNICATING DATA BETWEEN LOCALLY NETWORKED HETEROGENEOUS PROCESSING SYSTEMS AND COMMUNICATION SYSTEM USING SAID METHOD

CROSS-REFERENCE TO RELATED APPLICATIONS

This application is the National Stage of International Application No. PCT/FR2007/050969 International Filing Date 20 Mar. 2007, which designated the United States of America, and which International Application was published under PCT Article 21 (s) as WO Publication No. WO2007/107674 A2 and which claims priority from, and the benefit of, French Application No. 200650971 filed on 21 Mar. 2006, the disclosures of which are incorporated herein by reference in their entireties.

The aspects of the disclosed embodiments relate to a method for communicating data between locally networked heterogeneous data processing systems in which the configuration of the communications is stored in a memory linked to the network and accessible from each processing system. The aspects of the disclosed embodiments also relate to a communication system using this method.

The disclosed embodiments can be used in the field of network data communication, in particular by an Ethernet network, with remote or local processing systems on the same machine. In particular, the disclosed embodiments can be applied in the field of aeronautics, and especially aeronautical simulation and data transmission on board an aircraft or intended to be installed on board an aircraft.

BACKGROUND

In the field of data communication, it is common practice to connect different data processing systems together through a local network such as an Ethernet network. This linkage by local network permits different processing systems to exchange data between themselves with full security, in other words without external systems being able to access these data. In certain fields, and in particular in aeronautics, these systems are often installed little by little, depending on the needs and the development of these needs. In general, each of these systems has been installed or modified to solve one or more particular problems.

Consequently, each system is often set up in a particular context with a means of communication that is suitable for it. In particular, in the field of aeronautics, different systems such as computers, data processing applications, simulators, etc. are made by different manufacturers at different times, and thus with different technical development. These different systems are intended to be installed on the same aircraft, for example in the case of data transmission on board an aircraft, or associated with one another, for example in the case in which simulators are coupled with aircraft computers. Each system is thus put in place with a means of communication that is suitable for itself and which depends on the type of data to be processed, on the economic context, and on the technical context of the period in which the system was installed. Thus, each system is studied initially to work by itself and to solve specific problems. However, some data can be used in multiple processing systems. Also, by economizing material and processing time resources, it is common practice to link multiple processing systems to one another through a local network, of the type of an Ethernet network, to form a single communication system also called a communication network. Such a communication system then provides a global heterogeneous architecture.

Because of this heterogeneity of the processing systems, the networking of these systems necessitates adaptation of each of the systems to the means of communication to make the data comprehensible by each of the systems capable of sending or receiving these data. In other words, an unadapted system could not understand the data transmitted from another system. In the same way, the data sent by this system would be incomprehensible and accordingly unusable by the other systems in the network. This adaptation of systems necessitates the installation of means of translation that can translate data produced in the format of one system into the format of another system.

It is therefore understood that the greater the number of systems connected to the network, the more complex it is to configure these means of translation and the more time it takes to integrate these means.

Besides, each time a new system is installed and connected to the network, it is necessary to adapt the means of translation already in place to adapt the new system to the communication ensemble. The translation of the data format of the new system thus must be incorporated into the existing means of translation so that the data from this new system can be comprehensible by the systems already in place on the network.

Furthermore, the maintenance of the communication system ensemble is difficult and critical since each processing system requires different maintenance by different methods. Also, if a system is faltering at a given time, it is impossible to substitute for this system another system of the network to accomplish at least some of its processing, since each system has its own format.

Such a communication system with heterogeneous architecture thus presents the drawbacks cited above, with the consequences that this entails on its operating cost, which depends directly on the time to perfect the translation of the data and to search for the failures.

SUMMARY

The exact purpose of the disclosed embodiments is to remedy the drawbacks of the techniques described above. To this end, the disclosed embodiments propose a method for communicating data between multiple processing systems in which the same data configuration is adaptable to all of the systems. To do this, the method of the disclosed embodiments propose storing the base information relative to the data and to the topology of the network in a simple, homogeneous, and unequivocal form in a central memory accessible by all of the processing systems. This method thus proposes storing in memory all of the information necessary for all of the processing systems of the communication network in an identical form, in a place accessible by each. The data are exchanged between the systems in the form of messages that have a unique configuration and that have a number of data limited to the strict minimum. These data permit the system receiving the message to retrieve from the central memory all of the data corresponding to this message.

More precisely, the disclosed embodiments propose a method for communicating data between at least a first and a second data processing system connected to a local network, with each processing system being able to execute at least one application. This method is characterized by the fact that the data to be exchanged are organized into messages, with these messages and the processing systems and the applications being described in the files in memory in a backup unit connected to the network and accessible from the data processing systems, so that the data processing system receiving a message is able from data furnished in the message to retrieve from the files of the backup unit the data that are necessary for it.

The method of the disclosed embodiments can also comprise one or more of the following characteristics:
- one of the files in memory is a machine file that has a list of all of the processing systems with an address on the network for each system, defining a topology of the network,
- one of the files in memory is an application file that has a list of all of the applications and of the systems on which each application can be executed,
- one of the files in memory is a message file that has all of the data that can be exchanged, and the paths that can be utilized between the applications to transmit these data,
- one of the files in memory is a user file that has a name,
- the machine file, the application file, and the message file are files shared by all of the users,
- the user file is specific for each user,
- the files are in the XML format,
- each message has at least three data fields,
- a first field contains a message identifier, a second field contains the length of the message data, and a third field contains the parameters to be exchanged,
- the communication network uniting the processing systems is an Ethernet network.

The disclosed embodiments also relate to a data communication system that has a plurality of processing systems connected to a local network, characterized in that it has a memory unit comprising:
- a message file describing all of the data that can be exchanged on the network,
- a machine file describing a topology of the communication network with a list of all of the systems and of their respective addresses on the network,
- an application file defining all of the applications that can be executed on the network with all of the data related to each application.

The memory unit is centralized, installed on the network, and accessible by all of the processing systems.

BRIEF DESCRIPTION OF THE DRAWINGS

FIG. 3 shows a table describing examples of types of parameters of a message of FIG. 2.

FIGS. 4, 5, 6, and 7 show examples of files recorded in the centralized memory of the communication system of the disclosed embodiments.

DETAILED DESCRIPTION

Figure 1:
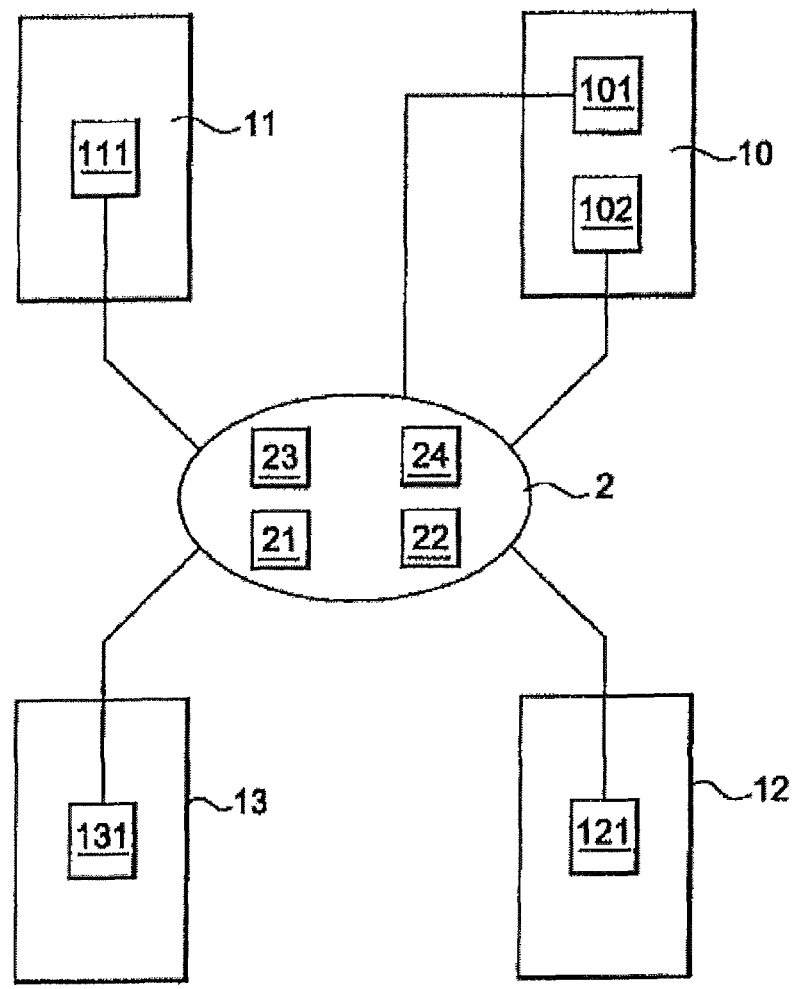
FIG. 1 shows schematically a communication network pursuant to the disclosed embodiments.

The disclosed embodiments relate to a data communication method, or a communication protocol, that permits an exchange of homogeneous data between multiple data processing systems connected through a local network. These systems can be installed on board an aircraft; they can also be on the ground, in particular when these systems are simulators coupled with airplane computers to validate said computers before the first flight. In the following description there will be discussion of a communication protocol in an aircraft, with the understanding that it also relates to systems on the ground, relative to the aircraft. This local network can be an Ethernet network or any other local network functioning by means of a protocol for data transmission by packets. The transmission of data on the local network is accordingly accomplished according to a standard transmission process such as that of the Ethernet network or of the Internet network. The data are transmitted on the network in the form of messages that have a particular configuration, described below.

The method of the disclosed embodiments consists of using a simple, unique, and homogeneous topology that permits describing all of the data useful to data processing systems with the same configuration and of recording the definition of these data on a single and unique centralized memory, also called the memory unit. This memory unit functions using a known format such as the XML format. The XML format is a computer language designed to manage long and complex documents such as those found in Intranet networks, and that lets the user select the type of data that he wishes to consult.

The configuration of the communications can also be assigned at the level of each user, with coherence being assured by the protocol of the disclosed embodiments.

According to the disclosed embodiments, the useful information to be stored in the memory unit concerns the identification of the users of the communication network, i.e. the applications executed by the processing systems of the network and the identification of the different data to be exchanged. The disclosed embodiments also propose identifying the formatting and distribution mechanisms of the data of each processing system.

To do that, the method of the disclosed embodiments proposes to describe all of the data in files recorded in the centralized memory. Each file unites the data relative to the same type of element, for example the processing systems, the applications, etc. In particular, in the preferred embodiment of the disclosed embodiments, four files provide for defining all of the data useful to all of the processing systems. As explained in greater detail below, a first file, called the machine file, describes the topology of the communication network with the list of all of the systems and their respective addresses on the network. A second file, called the application file, defines all of the applications that can be executed on the network with all of the data relative to each application. A third file, called the message file, describes all of the data that can be exchanged on the network with all of the information relative to these data. A fourth file, called the user file, identifies all of the users of the network, i.e. the name of each application of the network.

An example of a communication network using the method of the disclosed embodiments is shown in FIG. 1. This communication network 1 has multiple data processing systems. These processing systems are distant from one another, or are located on one and the same machine. In the example of FIG. 1, a system 111 is installed on a machine 11, a system 101 and a system 102 are installed on a machine 10, a system 131 is installed on a machine 13, and a system 121 is installed in a machine 12. These machines, for example, can be the on-board computer of an aircraft, a flight simulator, or any other computer permitting determination of the flight parameters of the aircraft.

These processing systems are connected to one another through a local network. A memory unit 2 for all of the information useful for these systems is also connected to this network. The memory unit is a backup unit dedicated solely to the configuration of the data that can be utilized by the data processing systems. This memory unit as shown in FIG. 1 corresponds to the configuration of the communications. This representation of the configuration of the communications is only one example. FIG. 1 is non-limiting with regard to the topology of the network. The memory unit 2 has multiple files, for example the machine file 21, the application file 22, the message file 23, and the user file 24, described below in detail.

The particular characteristic of this memory unit 2 is to be backed up permanently or quasi-permanently. All of the data processing systems of the network 1 have access to this memory unit 2. This memory unit thus constitutes a centralized means for backing up data. This memory unit 2 permits the assurance of prefect homogeneity of the communication network, since all of the data are described there in the same way. Thus, any processing system accessing data is certain to have the same information as that received or transmitted by another system on the network. This permits the communication network to be coherent since all of the necessary data are assembled in a single place with a unique configuration. The data can thus be understood in only a single and unique way by all of the processing systems of the network. Accordingly, no faulty interpretation is possible. The communication protocol pursuant to the disclosed embodiments is accordingly unequivocal.

An additional advantage of this centralized memory unit 2 is that each modification of data can be known by all of the processing systems. The modification is made only in the file or files containing this information and it is echoed to the systems when they search in the memory unit. In addition, if the method of the disclosed embodiments has chosen a conventional format such as the XML format, then the configuration of the network is open-ended in both the number of objects and in attributes characterizing each object. It thus permits rapid integration and coupling of a system since only the files of the memory unit have to be modified during the integration of a new system. The users of the network do not see their communication interface evolving in any case.

In this communication network according to the disclosed embodiments, the data are exchanged between the processing systems by means of messages circulating in the network. A message is a base element in the transmission on the network. To assure homogeneity of the network, the messages all have a unique configuration, i.e. they all have the same fields, positioned in the same order.

Figure 2:
FIG. 2 shows an example of a message exchanged in the communication system of FIG. 1 that has the configuration of the method of the disclosed embodiments.

FIG. 2 shows an example of a message that has a configuration conforming to the disclosed embodiments. This message has a first field ch1 called the identifying field and corresponding to the identification of the message in question. It has a second field ch2 called the length field that gives the size of the message expressed in octets. It has a third field ch3 called the parameter field that contains all of the parameters or data to be transmitted on the network. Thus each message circulating on the local network is identified by a unique number.

With the messages being the base elements exchanged between users, i.e. between the applications executed by the processing systems, each message contains:
   the identity of the message, with this identity being in the form of a whole number,
   the length of the message, which permits the user receiving the message to retrieve the type of data transmitted,
   the parameters, i.e. the data that have to be transmitted to another user. The system receiving the message, or the receiving user, is able from the information furnished in the message to retrieve from the memory unit files the data that it needs. In particular, from the length of the message the receiving system is able to retrieve the type of data, and from the parameters of the message it is able to determine the values of these data.

Figures 3, 4:
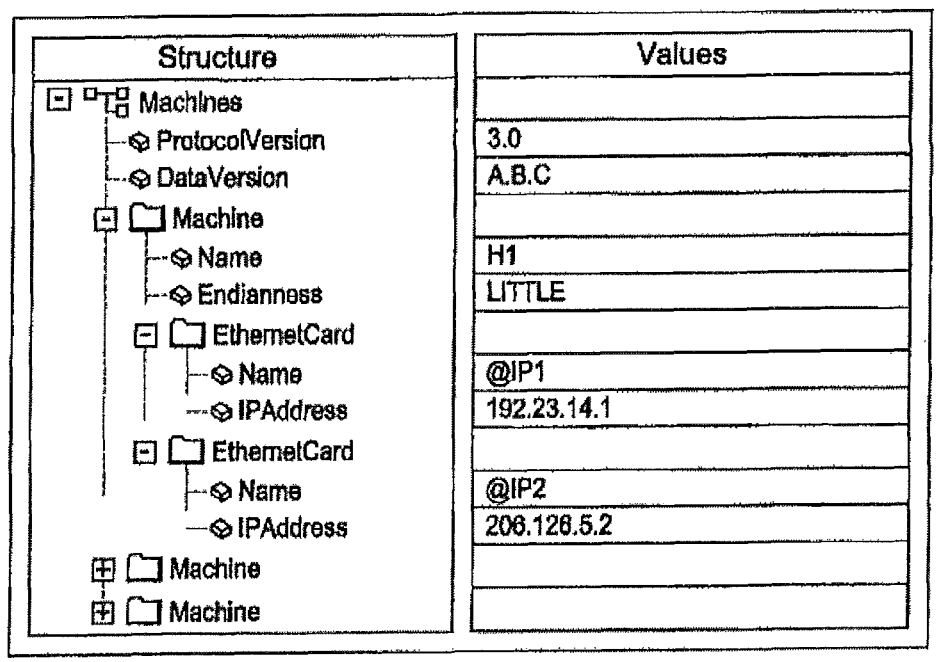

FIG. 3 shows in the form of a table some examples of types of parameters, or types of data, that may be contained in a message. This table has a list of types with the length in octets that corresponds to them. This is the value in octets that is transmitted in the message. Upon receiving a message, the receiving system looks in the configuration of the communications for the characteristics of the message that it has just received based on the identity of the message (first field). It compares the length (second field) with the theoretical length found in the configuration, for purposes of verification of the good condition of the communications, and then detects the collection of parameters that compose the message (third field) to be able to provide for decoding. These parameters, for example, can be a whole number, an octet, a real number, a table, or a parameter of variable size. In the case in which the elementary type is a parameter of variable size, the method of the disclosed embodiments provides for minimizing the bandwidth by transporting only what is strictly necessary.

The advantage of transmitting the length is to reduce the size of the message, which facilitates its transfer. Actually, reducing the size of the message to its strict minimum permits economizing the bandwidth and assuring a faster transmission of the message. Knowing the exact flow rates and volumes of data transported permits controlling the bandwidth and thus anticipating any congestion problems.

The configuration ensemble of the message just described permits limiting the size of the messages to the strict minimum. Thus, each message circulating on the network is reduced to its minimum, with this minimum nevertheless being sufficient for the message to be understood by the receiving system. It should be understood, however, that other message configurations can also be used.

As explained above, all of the data capable of being utilized in the communication network of the disclosed embodiments are defined and recorded in a unique centralized memory unit, or distributed at the level of each actor. These data are distributed among multiple configuration files, with each file being associated with a particular function of a particular element of the network. The data are thus dissociated into multiple files, which facilitates the physical description of the communication network, of the applications, and of the static and dynamic characteristics of the data.

In a preferred embodiment of the disclosed embodiments, the data are distributed into four files, already cited above:
   the machine file describes the topology of the network. An example of this file is shown in FIG. 4. This file describes all of the data and characteristics relative to each of the data processing systems of the network. This file in particular lists the machines on which the different systems are implanted. This file also lists the addresses of these systems on the network, under the address named IP. This machine file is shared by all of the users, i.e. all of the applications can have access to it from any processing system whatsoever of the network.
   the application file identifies all of the applications capable of being executed in the processing systems of the network. An example of such a file is shown in FIG. 5. This application file lists all of the applications of the network. For each application, it describes the processing systems on which the application can be executed. It also describes for each application the links between the different parameters. This links define the communication paths, called communication channels. These channels are defined by name, by IP address, by the type of formatting (endianness in English), and by their port number in the UDP/TCP sense. The TCP and UDP ports are data synchronization modes, respectively with or without a guarantee that the arrival and the order of arrival of the data are respected. This application file is shared by all of the users.

the message file identifies all of the data or parameters that can be exchanged. An example of such a file is shown in FIG. 7. This message file lists all of the messages, and for each message it describes the type of message, the type of communication, and the period of communication. The message file also describes for each message the application emitting the message, the application receiving the message, and the channels to be utilized to go from the emitting application to the receiving application. It also contains the identification of the message and the length of the message to be transmitted. Finally, it defines the parameters contained in each message and the type and size of these parameters. The message file is a file shared by all of the users.

the user file identifies the user itself, i.e. the application in question. An example of such a user file is shown in FIG. 6. This user file has the name of the application whose communications have to be taken into account. This file permits substituting a second user for a first user, simply by changing the name of the user in said file. This user file is specific for each user. It cannot be consulted by the other users.

Figures 8A, 8B:
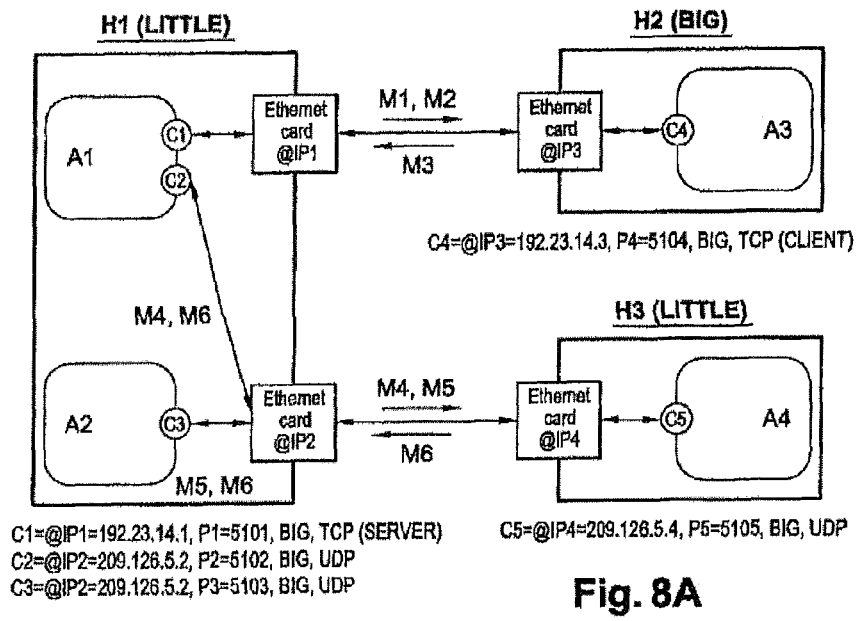
FIGS. 8A and 8B show respectively an example of communication of messages in a communication system pursuant to the disclosed embodiments, and a table summarizing this exchange.

FIGS. 8A and 8B show an example of a communication network pursuant to the disclosed embodiments in which three data processing systems H1, H2, and H3 are connected by an Ethernet network. The system H1 and the system H3 use processors of the Little type. System H2 uses a processor operating according to the Big type. The types Little and Big are two different incompatible methods of representing data in memory. The H1 system accommodates multiple applications, i.e. applications A1 and A2. The H2 system accommodates the application A3 and the H3 system accommodates the application A4.

Each of these applications uses a channel C to transmit its data on the network. For example, application A1 transmits its messages M1 and M2 via the channel C1 to the application A3, and its message M4 via the channel C2 to the application A4. The application A3 transmits its message M3 via the channel C4 to the application A1. The application A4 transmits its message M6 via the channel C5 to the applications A2 and A1. The application A2 transmits its message M5 via the channel C3 to the application A4.

Each channel C1, C2, C3, C4, or C5 is monitored via an IP address and a TCP or UDP port. Examples of addresses of these channels are noted beneath each system H1, H2, and H3.

Message exchanges between the three systems H1, H2, and H3 are summarized in the table of FIG. 8B. This table thus tabulates the data relative to the different messages emitted on the local network, in the network example of FIG. 8A. For example, the first message emission labeled 1 sends the message M1 from the application A1 via the channel C1 to the application A3 via the channel C4. The parameters transmitted by the message M1 are the parameter 132 and the parameter F64. This parameter F64 is a 64-bit real-type datum with 5 reals. The parameter 132 is a 32-bit integer.

Each application and each message having previously been defined in the memory unit, a message exchanged between two processing systems takes the formatting differences between the two systems directly into account without the necessity of adaptation. Actually, the files describing the data take the characteristics of each system into account, with the effect that the system itself does not have to manage any formatting or unformatting; it simply has to receive the message and to look in the file to which this message corresponds. The change of format is transparent. In the example of FIG. 8A, the change of format to change from a Little mode or to a Big mode (which are two different modes of arranging data in memory), is transparent for the systems H1, H2, and H3.

The invention claimed is:

1. A method for data communication in an aircraft between at least a first data processing system and a second data processing system connected in a local network, with each processing system being able to execute at least one application, the method comprising:

exchanging data between the data processing systems by means of messages circulating in the local network and all messages having a unique configuration, these messages and the processing systems and the applications being described in files in memory in a centralized backup unit connected to the local network, the memory being dedicated solely to configuration of data utilized by the data processing systems, and accessible by each of the data processing systems, receiving a message with one of the data processing systems such that the data processing system receiving the message is able from information furnished in the message to retrieve in the backup unit files the data corresponding to the message, wherein the message includes a unique identity information of the message and a length information of the message, and reducing a size of the message based on the length information for controlling a bandwidth of the local network during the data communication.

2. The method pursuant to claim 1, wherein one of the files in memory is a machine file that has a list of all of the processing systems with an address on the network for each system, defining a topology of the network.

3. The method pursuant to claim 1, wherein one of the files in memory is an application file that has a list of all of the applications and of the systems on which each application is executed.

4. The method pursuant to claim 1, wherein one of the files in memory is a message file that has all of the data that is exchanged and the paths that can be utilized between the applications to transmit these data.

5. The method pursuant to claim 1, wherein one of the files in memory is a user file that carries a name.

6. The method pursuant to claim 5, wherein the user file is specific for each user.

7. The method pursuant to claim 1, wherein the machine file, the application file, and the message file are files shared by all of the users.

8. The method pursuant to claim 1, wherein the files are in the Extensible Markup Language (XML) format.

9. The method pursuant to claim 1, wherein each message has at least three data fields.

10. The method pursuant to claim 9, wherein a first field contains a message identifier, a second field contains a data length of the message, and a third field contains the parameters to be exchanged.

11. The method pursuant to claim 1, wherein the communication network joining the processing systems is an Ethernet network.

12. A data communication system in an aircraft comprising:
   a plurality of processing systems,
   a local network joining the plurality of processing systems, where the plurality of processing systems are configured to exchange data between with each other by means of messages transferred between the plurality of processing systems, all messages having a unique configuration, and
   a memory unit installed on the local network and connected to the plurality of processing systems, the memory unit being centralized and accessible by all of the processing systems,
   the memory unit including:
   a message file describing all of the data that can be exchanged on the network, wherein each message in the message file includes a unique identity information of the message and a length information of the message such that a size of the message is reduced based on the length information for controlling a bandwidth of the local network during the data communication,
   a machine file describing a topology of the communication network with a list of all of the systems and their respective addresses on the network, and
   an application file defining all of the applications that can be executed on the network with all of the information relative to each application.

13. The data communication system pursuant to claim 12, wherein the memory unit is centralized, installed on the network, and accessible by all of the processing systems.

14. An aircraft having a data communication system comprising:
   a plurality of processing systems,
   a local network joining the plurality of processing systems, where the plurality of processing systems are configured to exchange data between with each other by means of messages transferred between the plurality of processing systems, all messages having a unique configuration, and
   a memory unit installed on the local network and connected to the plurality of processing systems, the memory unit being centralized and accessible by all of the processing systems,
   the memory unit including:
   a message file describing all of the data that can be exchanged on the network, wherein each message in the message file includes a unique identity information of the message and a length information of the message such that a size of the message is reduced based on the length information for controlling a bandwidth of the local network during the data communication,
   a machine file describing a topology of the communication network with a list of all of the systems and their respective addresses on the network, and
   an application file defining all of the applications that can be executed on the network with all of the information relative to each application.

\* \* \* \* \*